United States Patent
Schwarzer et al.

(10) Patent No.: US 7,889,132 B2
(45) Date of Patent: Feb. 15, 2011

(54) METHOD AND DEVICE FOR TRAVEL TIME-BASED LOCATION IDENTIFICATION WITH THE AID OF A TRIGGERED OR SELF-TRIGGERING REFERENCE SIGNAL

(75) Inventors: Stefan Schwarzer, Müchen (DE); Claus Seisenberger, Neufrannhofen (DE)

(73) Assignee: Siemens Aktiengesellschaft, Munich (DE)

( * ) Notice: Subject to any disclaimer, the term of this patent is extended or adjusted under 35 U.S.C. 154(b) by 167 days.

(21) Appl. No.: 12/310,434

(22) PCT Filed: Aug. 22, 2007

(86) PCT No.: PCT/EP2007/058747

§ 371 (c)(1),
(2), (4) Date: Feb. 24, 2009

(87) PCT Pub. No.: WO2008/025713

PCT Pub. Date: Mar. 6, 2008

(65) Prior Publication Data

US 2009/0322615 A1    Dec. 31, 2009

(30) Foreign Application Priority Data

Aug. 30, 2006  (DE) .................. 10 2006 040 497

(51) Int. Cl.
*G01S 1/24* (2006.01)
(52) U.S. Cl. ........................................ 342/387
(58) Field of Classification Search .......... 342/387
See application file for complete search history.

(56) References Cited

U.S. PATENT DOCUMENTS 4,916,455 A    4/1990 Bent et al.

2003/0069025 A1    4/2003 Hoctor et al.

(Continued)

FOREIGN PATENT DOCUMENTS

EP    1 763 164 A1    3/2007

(Continued)

OTHER PUBLICATIONS

"IEEE Standard for Information technology- Telecommunications and information exchange between systems—Local and metropolitan area networks—Specific requirements"; Sep. 8, 2006; pp. 1-323; 802.15.4; Part 15.4: Wireless Medium Access Control (MAC) and Physical layer (PHY) Specifications for Low-Rate Wireless Personal Area Networks (WPANs); IEEE Computer Society, New York, NY.

*Primary Examiner*—Thomas H Tarcza
*Assistant Examiner*—Harry Liu

(57) ABSTRACT

A method for the detection of an object by the TDOA principle is provided. The object transmits a signal, which is received by a plurality of stations having known positions. The stations' clocks can have different unknown time delays in relation to each other. An additional stationary reference station having a known position relative to the stations and transmitting a signal that is received by the stations is provided. An unknown transmission delay can be generated between the emission of the signal from the object and the emission of the signal from the reference station. For each station the difference in travel time between receipt of the signal from the object and the signal from the reference station and the difference of the travel time differences between the stations are determined. Mathematical algorithms for determining the location are performed.

19 Claims, 3 Drawing Sheets

U.S. PATENT DOCUMENTS

| | | |
|---|---|---|
| 2004/0108954 A1 | 6/2004 | Richley et al. |
| 2004/0260506 A1 | 12/2004 | Jones et al. |
| 2005/0130669 A1* | 6/2005 | Mizugaki et al. ......... 455/456.1 |
| 2006/0022873 A1* | 2/2006 | Zimmerman ................ 342/464 |
| 2006/0133271 A1 | 6/2006 | Mizugaki et al. |
| 2006/0183485 A1* | 8/2006 | Mizugaki et al. ......... 455/456.1 |
| 2009/0115658 A1* | 5/2009 | Zimmerman et al. ... 342/357.12 |

FOREIGN PATENT DOCUMENTS

| | | |
|---|---|---|
| GB | 2330716 A1 | 4/1999 |
| WO | WO 2005/098465 A2 | 10/2005 |

* cited by examiner

METHOD AND DEVICE FOR TRAVEL TIME-BASED LOCATION IDENTIFICATION WITH THE AID OF A TRIGGERED OR SELF-TRIGGERING REFERENCE SIGNAL

CROSS REFERENCE TO RELATED APPLICATIONS

This application is the US National Stage of International Application No. PCT/EP2007/058747, filed Aug. 22, 2007 and claims the benefit thereof. The International Application claims the benefits of German application No. 10 2006 040 497.1 DE filed Aug. 30, 2006, both of the applications are incorporated by reference herein in their entirety.

FIELD OF INVENTION

The present invention relates to a method according to the preamble of the main claim and a device according to the preamble of the coordinated claim.

BACKGROUND OF INVENTION

A large number of location identification/positioning methods and systems use what is known as the TDOA principle, where TDOA stands for "Time Difference of Arrival". In this way it becomes possible to locate objects, in particular terminal devices. Toward that end an object whose location is to be identified transmits a signal which is received by a plurality of fixed stations. The time difference between the arrival times at the individual fixed stations enables the position of the object whose location is to be identified to be determined with the aid of triangulation calculations.

An important prerequisite for determining an object's position is that the fixed stations establish the times of arrival in the same time axis. A clock offset leads to positions being identified incorrectly.

SUMMARY OF INVENTION

FIG. 1 shows the situation according to the closest prior art. An object X whose location is to be identified transmits a signal which reaches the fixed stations B1, B2 and B3 after the travel times $\Delta t_1$, $\Delta t_2$ and $\Delta t_3$. If all the stations measure along the same time axis, in other words if they have the same initial time offset $T_0$, then correct time differences will be determined which can be used for identifying the location of object X with the aid of a triangulation (formula 1):

$$\Delta t_{12} = (T_0 + \Delta t_2) - (T_0 + \Delta t_1) = \Delta t_2 - \Delta t_1$$

$$\Delta t_{23} = (T_0 + \Delta t_3) - (T_0 + \Delta t_2) = \Delta t_3 - \Delta t_2$$

$$\Delta t_{31} = (T_0 + \Delta t_1) - (T_0 + \Delta t_3) = \Delta t_1 - \Delta t_3$$

According to formula 1, the time offset $T_0$ can be factored out by means of the time differences. If, on the other hand, the stations have different time offsets $T_1$, $T_2$ and $T_3$, the time differences that result according to formula 2 are:

$$\Delta t_{12} = (T_2 + \Delta t_2) - (T_1 + \Delta t_1)$$

$$\Delta t_{23} = (T_3 + \Delta t_3) - (T_2 + \Delta t_2)$$

$$\Delta t_{31} = (T_1 + \Delta t_1) - (T_3 + \Delta t_3)$$

According to formula 2 it is clear that the unknown time offsets can no longer be factored out by means of the time differences and determining a position can henceforth only be carried out with inaccuracies. This is clear according to FIG. 2. The measured position X' differs from the actual position X.

Inaccuracies of said kind result in the case of all usable signals, such as, for example, optical, acoustic or electromagnetic signals.

A time synchronization between the individual fixed stations is of great importance for the use of a location identification/positioning system on account of the possible inaccuracies. In order to maintain a high degree of accuracy in the meter or sub-meter range, a clock offset must not be greater than a few picoseconds when electromagnetic or optical signals are used.

According to the prior art there are a number of synchronization methods available, though all of them are associated with high overhead and high costs.

According to the prior art, with the systems used, a highly accurate time synchronization is necessary between all the fixed stations or, as the case may be, stations with specified locations in order to reduce measurement inaccuracies to the necessary extent.

A generally known system is the conventional Global Positioning System (GPS), whose satellites have atomic clocks on board in order to ensure the same time axis is used. In addition the satellites are able to transmit synchronization data to one another with the aid of a direct line-of-sight link by means of laser beam. Disadvantageously, the costs and overhead for this synchronization are high.

Conventional location identification/positioning systems that are used, for example, on factory floors or on parking lots constantly synchronize the fixed stations with the aid of special synchronization algorithms by means of electric conductors or by means of radio links. Optical links are also possible. In this way the internal clocks are adjusted at regular intervals. A regular synchronization is necessary because the clocks, which use in particular quartz crystals, have both a time offset and slightly different frequencies. The positions of the fixed stations and the line lengths for synchronization must be known exactly in order to keep measurement errors to a minimum.

Further conventional systems use reference timers which transmit a synchronization signal at regular intervals. For that purpose the distances between the individual fixed stations and the fixed reference timer must be precisely known in order to take the travel time of the reference time signals into account during the synchronization.

Conventionally, synchronization algorithms or, as the case may be, reference timers are used, although the overhead is great.

It is the object of the present invention to locate an object X with a sufficiently high degree of accuracy at low cost by means of the TDOA (Time Difference of Arrival) principle in such a way that the object X whose location is to be identified transmits a signal which is received by a plurality of fixed stations whose clocks can have different unknown initial time offsets, yet no time synchronization is necessary between the individual fixed stations.

The object is achieved by means of a method according to the main claim. The object is achieved by means of a device according to the coordinated claim. Further advantageous embodiments are set forth in the dependent claims.

An object X whose location is to be identified transmits a signal which is received by a plurality of fixed stations $B_i$ having known positions. The travel times of the signals from the station X whose location is to be identified to the fixed stations $B_i$ are designated by $\Delta t_{Xi}$. The clocks in the fixed stations $B_i$ can now have any time offsets $T_i$. Approximately the same frequency should be applicable, however. Deviations of a few parts per million (ppm), as is usual with high-quality quartz crystals, are tolerable, since these lead to a small error which is acceptable.

In contrast to the prior art, a reference station R is additionally included in a conventional arrangement. The position of the reference station R relative to the fixed stations $B_i$ must be known.

The travel times of the signals from the fixed reference station R to the fixed stations $B_i$ are designated by $\Delta t_{R_i}$. Each fixed station $B_i$ (i element from N) now determines, not the absolute time of the signal arrivals, but only the travel time difference $\Delta t_i$ between the arrival of the signals from the object X and the reference station R. In this case an error due to slightly different clock frequencies is all the smaller, the closer in time object X and reference station R have transmitted their respective signals. In this way knowledge of the clock time offsets $T_i$ is not necessary.

A time offset $\Delta t_{XR}$ can be present between the transmission of the signal by object X and the transmission of the signal by the reference station R. Said unknown time offset or transmission offset $\Delta t_{XR}$ can be factored out by forming the difference in the travel time differences $\Delta t_i$ between the fixed stations.

The following variables are sufficient for determining the position of the object X:

The positions of the stations $B_i$ and the reference station R;

The measured or calculated values of the differences in the travel time differences $\Delta t_i$ between the stations $B_i$.

Finally, only triangulation calculations or generally known mathematical calculations, for example, must be performed for determining the position. Triangulation is a method used in trigonometry and elementary geometry for finding the distance from a point.

In this way a synchronization is no longer necessary. A cost-effective and flexible location identification/positioning system can be created. The cost aspect is often of great importance. The essential advantage of the present invention is that aforesaid highly precise time synchronizations no longer need to take place between the fixed stations $B_i$. A further fixed station R is used which transmits, synchronously or with an offset in time, in the same channel as X or in a different channel. According to the method of the main claim, neither determining the unknown clock offsets $T_i$, nor determining the unknown transmission offset $\Delta t_{XR}$ is necessary since these can be factored out by means of mathematical formulae used. If object X and reference station R transmit in only one channel, a transmission offset $\Delta t_{XR}$ is at least as large as the length of the signal from object X.

Further advantageous embodiments are set forth in the dependent claims.

According to one advantageous embodiment, the signal from the object X and signal from the reference station R are transmitted simultaneously in two different channels. The use of two different channels for object X and reference station R enables the fully synchronous transmission of signals from both stations. In this way the measurement rate, i.e. the number of measurements per second, and an achievable precision can advantageously be improved. The transmission offset $\Delta t_{XR}$ between the transmission of the signal from the object X and the transmission of the signal from the reference station R is zero and consequently does not need to be taken into account any further.

According to a further advantageous embodiment, the object X and the reference station R are prompted by a station $B_i$ to transmit their signals simultaneously by means of a common trigger line. Both the reference station R and the object X are prompted to transmit their signals simultaneously by way of a common trigger line which can be wired or wireless.

According to a further advantageous embodiment, the reference station R transmits in a first channel, or in a second channel if the reference station R has detected that the object X is transmitting in a first channel, with a time offset $\Delta t_{XR}$ being applicable between the transmission of the signal by the object X and the transmission of the signal by the reference station R. R transmits only after X has transmitted. Particularly advantageously, no synchronization must be produced between the two signals. Use of a common channel or two different channels is possible. According to this embodiment the reference station R is passive until it has detected a signal from object X. Then the signal of the reference station R can either be transmitted with the signal of object X in the same or a different channel, or almost simultaneously with the object X in a different channel. According to this embodiment, R transmits only if R has detected that X is transmitting. This embodiment variant is particularly advantageous because in this way communication between the base stations $B_i$ and the reference station R is unnecessary. According to this embodiment, a communication with X does not need to take place since the object X transmits a signal, for example, at fixed time intervals or upon detecting an event. This embodiment can be improved particularly advantageously by use of two channels.

According to a further advantageous embodiment, the signal from the object X and the signal from the reference station R are transmitted in two different channels with an arbitrary time offset. An arbitrary time offset $\Delta t_{XR}$ between the transmission of the signal by the object X and the transmission of the signal by the reference station R is generated. Particularly advantageously, no synchronization needs to be produced between the two signals. The smaller the transmission offset $\Delta t_{XR}$ or, as the case may be, the time offset $\Delta t_{XR}$, the smaller is the error due to slightly different clock frequencies of the stations $B_i$ which should have approximately the same frequency. The signal from the object X and the signal from the reference station R can equally be transmitted offset in time in one channel.

According to a further advantageous embodiment, a communication takes place between the fixed stations $B_i$ so that the differences in the travel time differences $\Delta t_i$ can be determined. A communication of said kind can be established in a wired or wireless manner and places no special requirements on the travel time of the communication signals.

According to a further advantageous embodiment, the clock frequency of the reference station R is determined by means of the signal transmitted by the reference station R and deviations of the clock frequencies of the stations $B_i$ are factored out. In this way there is a possibility to compensate for a difference in the clock frequencies in the individual fixed stations $B_i$ which are a reason for inaccuracies in determining the position of object X.

According to a further advantageous embodiment, objects X are terminal devices conforming to the IEEE 802.15.4 standard.

According to the device claims, devices are claimed by means of which methods according to the method claims can be carried out.

BRIEF DESCRIPTION OF THE DRAWINGS

The present invention is described in more detail below with reference to exemplary embodiments in conjunction with the figures, in which.

DETAILED DESCRIPTION OF INVENTION

Figure 1:
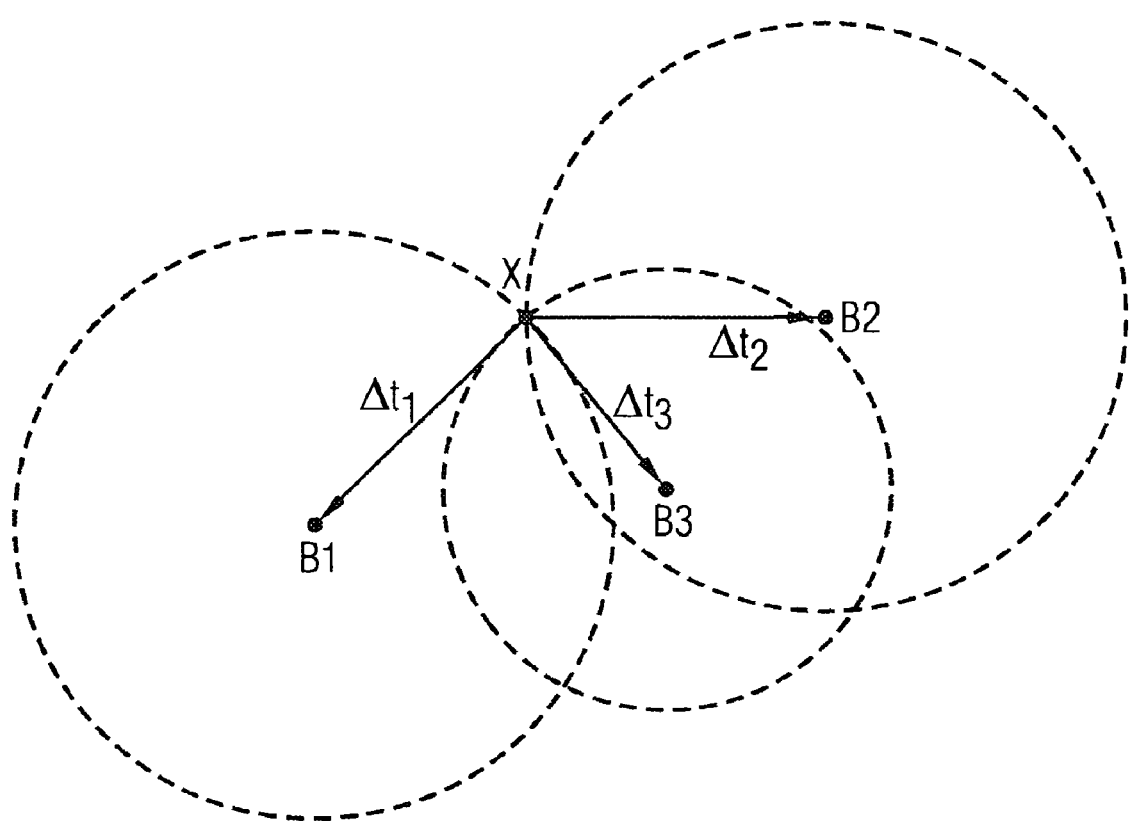
FIG. 1 shows an exemplary embodiment of a measurement method according to the prior art.

FIG. 1 shows an object X and three fixed stations B1, B2 and B3. The object X transmits a signal which reaches the fixed stations B1, B2 and B3 after the travel times $\Delta t_1$, $\Delta t_2$ and $\Delta t_3$. If all the stations are in the same time axis, i.e. all the stations have the same initial time offset $T_0$, correct time differences are determined which, with the aid of a triangulation, can lead to the identifying of the location of X (formula 1):

$$\Delta t_{12} = (T_0 + \Delta t_2) - (T_0 + \Delta t_1) = \Delta t_2 - \Delta t_1$$

$$\Delta t_{23} = (T_0 + \Delta t_3) - (T_0 + \Delta t_2) = \Delta t_3 - \Delta t_2$$

$$\Delta t_{31} = (T_0 + \Delta t_1) - (T_0 + \Delta t_3) = \Delta t_1 - \Delta t_3$$

Figure 2:
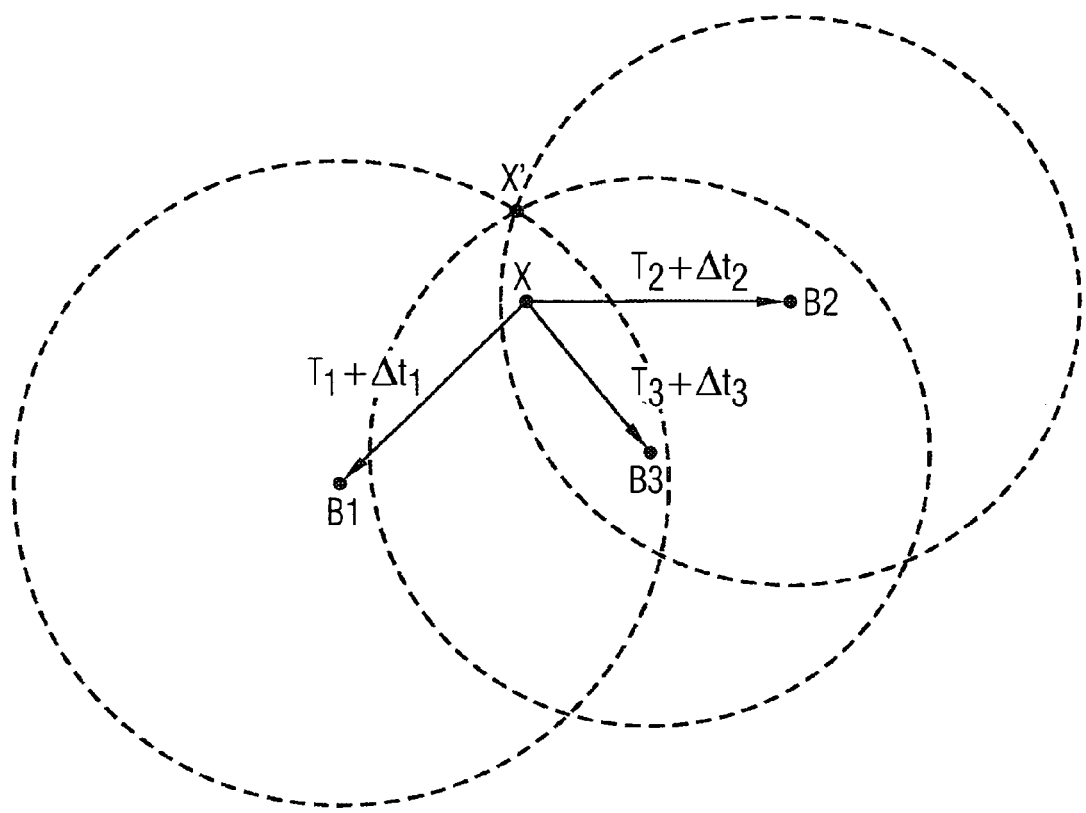
FIG. 2 shows an exemplary embodiment with the errors according to the prior art method.

FIG. 2 shows that with unknown different time offsets $T_1$, $T_2$ and $T_3$ are no longer removed from the time differences (formula 2):

$$\Delta t_{12} = (T_2 + \Delta t_2) - (T_1 + \Delta t_1)$$

$$\Delta t_{23} = (T_3 + \Delta t_3) - (T_2 + \Delta t_2)$$

$$\Delta t_{31} = (T_1 + \Delta t_1) - (T_3 + \Delta t_3)$$

Figure 3:
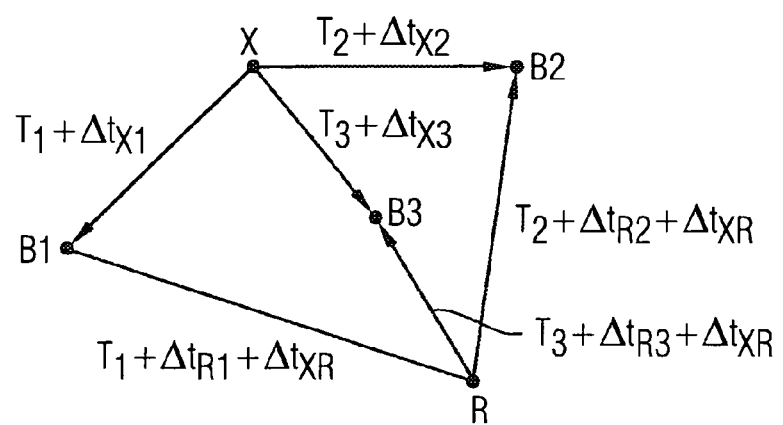
FIG. 3 shows an exemplary embodiment of a device according to the invention.

Determining an object's position can only be carried out with inaccuracies. A measured position X' differs from the actual position X:

FIG. 3 shows an exemplary embodiment of an arrangement according to the invention. Said arrangement corresponds to that described in FIG. 2, except that inserted in addition is a reference station R whose position relative to the fixed stations $B_1$, $B_2$ and $B_3$ is known. The travel times of the signals from the station X whose location is to be identified to the fixed stations $B_1$, $B_2$ and $B_3$ are designated by $\Delta t_{X1}$, $\Delta t_{X2}$ and $\Delta t_{X3}$. The travel times of the signals of the fixed reference station R to the fixed stations $B_1$, $B_2$ and $B_3$ are designated by $\Delta t_{R1}$, $\Delta t_{R2}$ and $\Delta t_{R3}$. The use of three stations for the purpose of determining two space coordinates is preferred. However, more or fewer stations can also be used. A mathematical method for location identification can be a hyperbolic section method, for example.

The clocks or, as the case may be, time recording devices in the fixed stations $B_1$, $B_2$ and $B_3$ may now have the unknown and arbitrary time offsets $T_1$, $T_2$ and $T_3$, though these should have approximately the same frequency. Deviations of a few parts per million (ppm), as is usual with high-quality quartz crystals, are acceptable. They lead merely to a small, tolerable error.

Figure 4A:
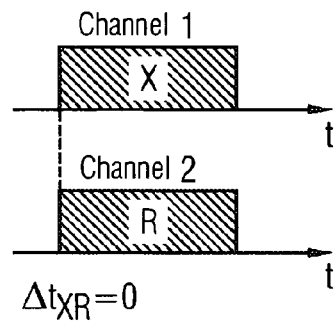
FIG. 4 shows exemplary embodiments of the transmission of signals.
Figure 4B:
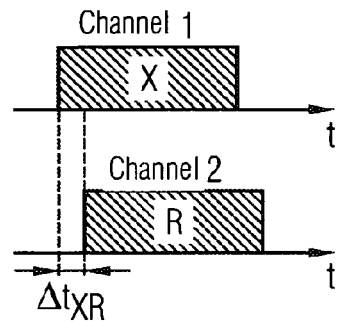
Figure 4C:
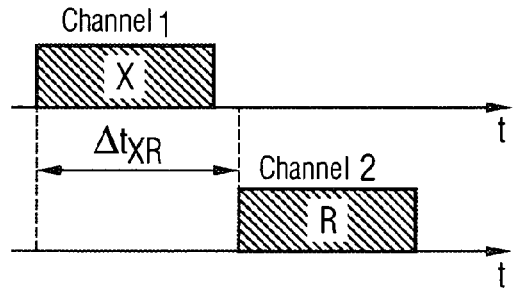
Figure 4D:

The considerably greater error source due to the time offset $\Delta t_{XR}$ is removed as follows:

Both X and R transmit a signal. The following combinations of the sending of the two signals are possible. These are shown according to FIG. 4:

R and X transmit simultaneously in two different channels, for example by common triggering from a fixed station $B_i$ via a trigger line (case FIG. 4a);

R and X transmit offset in time in two different channels (cases FIG. 4: b and c);

R and X transmit offset in time in the same channel (case FIG. 4: d);

R transmits as soon as R detects that X is transmitting. In this instance both variants are also applicable, namely one channel or two channels (cases FIG. 4: b, c and d).

In the first case both R and X are prompted by way of a common trigger line (wired or wireless) to transmit their signals simultaneously. In the last case R is passive until it detects a signal from X. Then the signal from R can be transmitted either after the signal from X in the same or a different channel (cases c and d), or almost simultaneously with X in a different channel (b).

Except for case (a) an unknown time offset, designated by $\Delta t_{XR}$, results between the transmission of the signals from X and R.

Each fixed station $B_1$, $B_2$ and $B_3$ now determines, not the absolute time of the signal arrivals, but only the time difference between the arrival of the signals from X and R. In this case the error due to slightly different clock frequencies of the clocks in the fixed stations $B_1$, $B_2$ and $B_3$ is all the smaller, the closer in time X and R have transmitted their signals. It is particularly advantageous if, for example, the time offset $\Delta t_{XR}$ is less than 10% of the duration of the signal from the object X. Knowledge of the clock offsets $T_1$, $T_2$ and $T_3$ is not necessary. The results for the travel time difference in the signals from X and R at the three fixed stations $B_1$, $B_2$ and $B_3$ (formula 3) are:

$$\Delta t_1 = (T_1 + \Delta t_{R1} + \Delta t_{XR}) - (T_1 + \Delta t_{X1}) = \Delta t_{R1} - \Delta t_{X1} + \Delta t_{XR}$$

$$\Delta t_2 = (T_2 + \Delta t_{R2} + \Delta t_{XR}) - (T_2 + \Delta t_{X2}) = \Delta t_{R2} - \Delta t_{X2} + \Delta t_{XR}$$

$$\Delta t_3 = (T_3 + \Delta t_{R3} + \Delta t_{XR}) - (T_3 + \Delta t_{X3}) = \Delta t_{R3} - \Delta t_{X3} + \Delta t_{XR}$$

The unknown transmission offset $\Delta t_{XR}$ is factored out below by forming the difference of the travel time differences $\Delta t_i$ between the fixed stations (formula 4):

$$\Delta t_{12} = \Delta t_2 - \Delta t_1 = (\Delta t_{R2} - \Delta t_{X2} + \Delta t_{XR}) - (\Delta t_{R1} - \Delta t_{X1} + \Delta t_{XR})$$
$$= \Delta t_{R2} - \Delta t_{X2} - \Delta t_{R1} + \Delta t_{X1}$$

$$\Delta t_{23} = \Delta t_3 - \Delta t_2 = (\Delta t_{R3} - \Delta t_{X3} + \Delta t_{XR}) - (\Delta t_{R2} - \Delta t_{X2} + \Delta t_{XR})$$
$$= \Delta t_{R3} - \Delta t_{X3} - \Delta t_2 + \Delta t_{X2}$$

$$\Delta t_{31} = \Delta t_1 - \Delta t_3 = (\Delta t_{R1} - \Delta t_{X1} + \Delta t_{XR}) - (\Delta t_{R3} - \Delta t_{X3} + \Delta t_{XR})$$
$$= \Delta t_{R1} - \Delta t_{X1} - \Delta t_{R3} + \Delta t_{X3}$$

$\Delta t_{XR}$ does not need to be known. Consequently, the three values determined by means of formula 4 can be determined through measurement of the travel time differences $\Delta t_1$, $\Delta t_2$ and $\Delta t_3$, which can be carried out by means of conventional digital signal processing algorithms. The following variables are sufficient for determining the position or identifying the location of the object X according to the modified TDOA principle described here:

The positions of $B_1$, $B_2$, $B_3$ and R;

The measured or calculated values of the differences $\Delta t_{12}$, $\Delta t_{23}$ and $\Delta t_{31}$ in the travel time differences $\Delta t_i$.

It is self-evident that calculating $\Delta t_{12}$, $\Delta t_{23}$ and $\Delta t_{31}$ necessitates a communication between the fixed stations $B_1$, $B_2$ and $B_3$. The communication can take place on a wired or wireless basis and places no special requirements on the travel times of the communication signals. The method and the device according to the present invention differ significantly from the methods according to the prior art. According to the present application, no communication is necessary with X and R.

The industrial radio standard IEEE 802.15.4 and the routing algorithms of the ZigBee Alliance that are based thereon are already being used today and will be used increasingly in the future for building and manufacturing automation. The advantages are a particularly robust data transmission through the use of low data rates with high bandwidths and the possibility of building a self-organizing mesh network for data transmission over long distances. The small current consumption allows the use of small terminal devices with high battery life.

ZigBee routing according to the IEEE 802.15.4 standard is particularly advantageous if a precise identification of the location of a ZigBee terminal device is possible. In this case assigning physical addresses can be dispensed with and addressing can be implemented by way of positions. As an example let a light switch be cited which is to switch on, not lamp no. 547, but the lamp at position (X/Y/Z) equal to (5 m/7 m/1 m). For this, a high degree of precision is necessary in order to be able to distinguish the lamp unambiguously from the adjacent lamps. The present invention is of interest in particular for this application, since a location identification/positioning system can be built cheaply and flexibly. The advantageous absence of communication links to the stations X whose locations are to be identified benefits in particular ZigBee terminal devices which possess no receiver but transmit a signal only when specific events occur (when a light switch is pressed, for example). The reference station R receives said signal and sends the required reference signal afterward. ZigBee permits the use of a plurality of channels, thereby enabling these embodiment variants to be used also.

In this way the greatest technological problem confronting ZigBee to date, namely the precise identification of the location of terminal devices with minimal intervention in the existing infrastructure, can be solved.

It is possible for proprietary location identification/positioning systems to be replaced by the location identification system described in this invention. The majority of conventional location identification/positioning systems operate in a proprietary manner, with high precision, at very high cost. An alternative is for conventional location identification/positioning systems to use standard hardware such as wireless local area networks (WLANs), though these allow a very low precision of position determination at low cost. The method and the device according to the present invention enable the position or location of an object X to be determined or identified with a sufficiently high degree of precision at low cost.

The invention claimed is:

1. A method for identifying the location of an object by a TDOA (Time Difference of Arrival) principle comprising:
   transmitting a signal to a plurality of fixed stations having known positions by the object;
   transmitting a signal to each of the plurality of fixed stations by a fixed reference station having a known position relative to each of the plurality of fixed stations;
   generating an unknown transmission offset between the transmission of the signal from the object and the transmission of the signal from the reference station;
   determining a travel time difference between the arrival of the signal from the object and the arrival of the signal from the reference station for each of the plurality of fixed stations;
   determining a difference of the travel time differences between the plurality of fixed stations; and
   wherein a plurality of clocks corresponding to each of the plurality of fixed stations have different unknown time offsets relative to one another, and
   wherein location information is calculated by a mathematical method.

2. The method as claimed in claim 1, wherein the signal from the object and the signal from the reference station are transmitted simultaneously in two different channels and the transmission offset is equal to zero.

3. The method as claimed in claim 2, wherein the object and the reference station are prompted by at least one of the plurality of fixed stations by a common trigger line to transmit their respective signals simultaneously.

4. The method as claimed in claim 1, wherein the reference station transmits in a first channel or in a second channel when the reference station has detected that the object is transmitting in the first channel.

5. The method as claimed in claim 4, wherein the signal from the object is transmitted after a fixed time interval.

6. The method as claimed in claim 4, wherein the signal from the object is transmitted upon detecting an event.

7. The method as claimed in claim 1, wherein the signal from the object and the signal from the reference station are transmitted with a time offset within one channel or within two different channels.

8. The method as claimed in claim 1, wherein a communication takes place between the plurality of fixed stations to determine a plurality of differences in the travel time differences between the plurality of fixed stations.

9. The method as claimed in claim 1, wherein a clock frequency of one of the plurality of reference stations is determined by factoring out the signal transmitted by the reference station and a plurality of deviations of the clock frequencies of the plurality of fixed stations.

10. The method as claimed in claim 1, wherein a precise identification of the location of a ZigBee terminal device, embodied as the object, is carried out.

11. A device for identifying the location of an object by a TDOA (Time Difference of Arrival) principle comprising:
    an object;
    a plurality of fixed stations each having a known position;
    a fixed reference station having a known position relative to the plurality of fixed stations;
    a device for determining, for each of the plurality of fixed stations, a travel time difference between an arrival of the signal from the object and an arrival of a signal from the reference station;
    a device for determining a difference in the travel time differences between the fixed stations; and
    a device for carrying out mathematical calculations to determine a location information,
    wherein the object transmits the signal which is received by the plurality of fixed stations having known positions,
    wherein the signal from the reference station is received by the fixed stations generating an unknown transmission offset between the transmission of the signal from the object and the transmission of the signal from the reference station,
    wherein a plurality of clocks corresponding to each of the plurality of the fixed stations have different unknown time offsets relative to one another.

12. The device as claimed in claim 11, wherein the signal from the object and the signal from the reference station are transmitted simultaneously in two different channels and the transmission offset is equal to zero.

13. The device as claimed in claim 12, wherein the object and the reference station are prompted by one of the plurality of fixed stations by a common trigger line to transmit their respective signals simultaneously.

14. The device as claimed in claim 11, wherein the reference station transmits in a first channel or in a second channel when the reference station has detected that the object is transmitting in the first channel.

15. The device as claimed in claim 14, wherein the signal from the object is transmitted after a fixed time interval.

16. The device as claimed in claim 14, wherein the signal from the object is transmitted upon detecting an event.

17. The device as claimed in claim 11, wherein the signal from the object and the signal from the reference station are transmitted offset in time in one channel or in two different channels.

18. The device as claimed in claim 11, wherein a communication takes place between the plurality of fixed stations to determine a plurality of differences in the travel time differences between the plurality of fixed stations.

19. The device as claimed in claim 11, wherein a clock frequency of one of the plurality of reference stations is determined by factoring out the signal transmitted by the reference station and a plurality of deviations of the clock frequencies of the plurality of fixed stations.

* * * * *